United States Patent [19]

Kehr et al.

[11] 3,959,191

[45] May 25, 1976

[54] NOVEL HYDROPHOBIC POLYURETHANE FOAMS

[75] Inventors: Clifton L. Kehr; Nelson S. Marans, both of Silver Spring, Md.

[73] Assignee: W. R. Grace & Co., New York, N.Y.

[22] Filed: Dec. 30, 1974

[21] Appl. No.: 537,617

Related U.S. Application Data

[63] Continuation of Ser. No. 322,666, Jan. 11, 1973, abandoned.

[52] U.S. Cl. ............... 260/2.5 AD; 260/2.5 AB; 260/2.5 AC; 260/2.5 AG; 260/2.5 AN; 260/2.5 AP; 428/95; 428/314
[51] Int. Cl.$^2$ ............... C08G 18/10; C08G 18/14; C08G 5/19
[58] Field of Search ............... 260/2.5 AD, 2.5 AN, 260/2.5 AP, 29.2 TN, 2.5 AG, 2.5 AC, 2.5 AB

[56] References Cited
UNITED STATES PATENTS

| | | | |
|---|---|---|---|
| 2,726,219 | 12/1955 | Hill | 260/2.5 AP |
| 2,901,445 | 8/1959 | Harris | 260/2.5 AG |
| 2,968,575 | 1/1961 | Mallonee | 260/29.2 TN |
| 3,294,724 | 12/1966 | Axelrood | 260/29.2 TN |
| 3,437,624 | 4/1969 | Dawn | 260/29.2 TN |
| 3,563,943 | 2/1971 | Davis | 260/29.2 TN |
| 3,646,178 | 2/1972 | Traubel | 260/29.2 TN |
| 3,655,627 | 4/1972 | Hutzler | 260/29.2 TN |

*Primary Examiner*—C. Warren Ivy
*Attorney, Agent, or Firm*—Eugene M. Bond

[57] ABSTRACT

The invention disclosed is for new improved hydrophobic polyurethane foams prepared by reacting a hydrophobic polyisocyanate reactant with large amounts of an aqueous reactant in the presence of an emulsifying agent. The resultant foams may be characterized with a broad spectrum of improved properties including load-bearing characteristics, hydrophobic properties, textural characteristics and the like.

8 Claims, No Drawings

NOVEL HYDROPHOBIC POLYURETHANE FOAMS

This is a continuation, of application Ser. No. 322,666 filed Jan. 11, 1973, now abandoned.

This invention relates to new improved hydrophobic polyurethane foams and to a method for their preparation. More particularly, the present invention relates to hydrophobic foams prepared from a hydrophobic water insoluble polyisocyanate reactant under prescribed conditions with large amounts of an aqueous reactant while in the presence of an emulsifying agent.

Preparation of hydrophobic polyurethane foams is known to the art. Typically, these preparations involve use of reactants such as a polyoxyalkylene or polyester polyol, a polyisocyanate, near stoichiometric amounts of water, and a catalyst.

Hydrophobic polyalkylene ether or ester polyols coupled with polyisocyanate have not heretofore been converted to polyurethane foams by reaction with large amounts of water because these materials are basically incompatible and, on mixing they separate into two immiscible phases. Also, these foaming reactions have rigidly adhered to use of near stoichiometric reaction amounts for foaming gas generation.

It has now been found, however, that water-insoluble polyisocyanates may be converted into useful foam products by using prescribed amounts of an aqueous reactant, a catalyst, and particular emulsifying agents.

Generally stated, the present hydrophobic foam may be prepared by reacting water-insoluble polyalkylene ether or ester polyisocyanate with large amounts of an aqueous reactant while in the presence of an emulsifying agent. Also, the hydrophobic, water-insoluble ether or ester polyol may be capped desirably with a polyisocyanate such that the capped product has an isocyanate reaction functionality greater than two. The capped product is foamed simply by combining under proper mixing conditions with a suitable aqueous reactant and emulsifying agent. Optionally, the capped product and/or aqueous reactant may contain a suitable crosslinking agent if desired, in which case the capped polyalkylene ether or ester polyol may have a functionality approximating 2.

During capping, it is desirable that polyisocyanate be reacted with the polyol such that the reaction product, i.e., the capped product, is substantially void of reactive hydroxy groups while containing two or more reactive isocyanate sites per average molecule. Another route for achieving this desired result is to react a polyisocyanate having two reactive active isocyanate sites per average molecule, in a reaction system during foaming having a polyfunctional reactive component such as one having from three up to about six or more reactive amine, hydroxy, thiol, or carboxylate sites per average molecule. These latter sites are highly reactive with the two reactive isocyanate sites and thereby form a crosslinked three-dimensional product.

Polyalkylene ether or ester polyol used as a reactant herein may have a weight average molecular weight of about 200 to about 20,000, and preferably between about 600 to about 6,000, and a hydroxyl functionality ranging from about 2 to about 8 hydroxyl groups per molecule.

Emulsifying agents found useful herein include N-lauroyl sarcosine, N-cocoyl sarcosine, N-stearoyl sarcosine, N-oleoyl sarcosine, and tall oil acyl sarcosine. These fatty acyl sarcosine materials are commercially available from Hampshire Chemical Corp. under the mark "Hamposyls" and may be used along with the alkali metal and ammonium salts thereof. Also, the analogous alkyl sarcosines have been found to be useful. The acyl or alkyl group of these agents have from about 8 to about 24 carbon atoms. The preferred sarcosine emulsifying agents are N-oleoyl sarcosine and N-lauroyl sarcosine. The sarcosine emulsifying agent is included in an operable amount from about 0.25 to about 10 parts, and perferably from about 1 to about 5 parts based on 100 parts by weight of polymeric polyisocyanate to be reacted.

Additional emulsifying agents may be useful in practice of this invention. For example, anionic agents such as N-oleoyl iminodiacetic acid, and the corresponding acyl- and alkyl-iminodiacetic may be used. Also, nonionic surfactants may prove useful such as, for example, condensates of ethylene oxide with a hydrophobic base. These latter materials are the well known surfactants sold under the mark Pluronic by Wyandotte Corp.

Numerous emulsifying agents may also prove useful herein. It thus appears that the class of the emulsifying agent is less important than is the fact that it be soluble in one of the reactant components, and that an effective emulsion be present at the time of reaction to foaming. The emulsifying agent may be added either separately, along with the polyisocyanate reactant or the aqueous reactant as desired, provided the agent is present during the mixing and the subsequent foaming reaction. Emulsification may be effected by numerous means including, for example, high shear mechanical mixing, sonic mixing, and the like. Often, when highly effective and compatible emulsifying agents are employed, even simple mixing may be sufficient to prepare a useful emulsion.

Polymeric polyols generally useful herein as a component of the resin reactant may be simply reacted or may be terminated or capped by prior reaction with a polyisocyanate. The latter reaction may be carried out in an inert moisture-free atmosphere such as under a nitrogen blanket, at atmospheric pressure at a temperature in the range of from about 0°C. to about 120°C. for a period of time of about 0.5 to about 20 hours, depending upon the temperature and degree of agitation. This reaction may be effected also under atmospheric conditions provided the product is not exposed to excess moisture. The polyisocyanates used for capping the polymeric polyol include polyisocyanates and polyisothiocyanates which are PAPI-1 (a polyaryl polyisocyanate as defined in U.S. Pat. No. 2,683,730), tolylene diisocyanate, triphenylmethane-4,4'4''-triisocyanate, 3-isocyanate-methyl-3,5,5-trimethylcyclohexylisocyanatemethyl (IPDI) benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1, 5-diisocyanate, xylene-alpha,alpha'-diisocyanate, 3,3'-dimethyl-4,4'-biphenylene diisocyanate, 3,3'-dimethoxy-4,4'-biphenylene diisocyanate, 2,2'-5,5' -tetramethyl-4,4'-biphenylene diisocyanate, dicyclohexylmethane 4,4'-diisocyanate (NMDI), 4,4'-methylenebis(phenylisocyanate) 4,4'-dicyclohexyl-diisocyanate, 4,4'-sulfonylbis (phenylisocyanate), 4'4-methylene di-orthotolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost.

Capping of the polymeric polyol may be effected using about stoichiometric amounts of reactants. Desirably, however, an excess of isocyanate is used to insure complete capping of the hydroxyl component. Thus, the ratio of isocyanate groups to the hydroxyl groups of the glycol member is between about 1 to about 4 isocyanate to hydroxyl, and preferably about 2 to about 3 isocyanate to hydroxyl molar ratio.

To obtain the maximum strength, solvent resistance, heat resistance, resistance to compression set and the like, the isocyanate capped products are formulated in such a manner as to give crosslinked, three dimensional network polymers on foaming. In order to achieve such infinite network formation on foaming, the reactive components may be formulated in one of the following by way of example. First, when water is the sole reactant with the isocyanate groups leading to chain growth during the foaming process, the isocyanate capped product must have an average isocyanate functionality greater than 2 and up to about 8 or more. Secondly, when the isocyanate capped product has an isocyanate functionality of only about two, then the water or aqueous reactant used may contain a dissolved or dispersed isocyanate-reactive crosslinking agent having an effective functionality greater than two. In this case, the reactive crosslinking agent is reacted with the capped diisocyanate when admixed during and after the foaming process has been initiated. Thirdly, when the isocyanate capped diisocyanate has an isocyanate functionality of only about two, then a polyisocyanate crosslinking agent having an isocyanate functionality greater than two may be incorporated therein, either preformed or formed in situ, and the resultant mixture may then be emulsified and reacted with water or aqueous reactant, optionally containing a dissolved or dispersed reactive isocyanate-reactive crosslinking agent, leading to a crosslinked, infinite network hydrophobic polyurethane foam. If a crosslinking network foam structure is desired, the presence of the crosslinking agent in the water or aqueous reactant is crucial when the isocyanate capped reaction product has a functionality of only about two and only optional when the functionality thereof is greater than two.

Water soluble or water dispersible crosslinking agents operable in this invention desirably should be polyfunctional and reactive with isocyanate groups and include but are not limited to materials such as diethylenetriamine, triethylenetetramine, tetraethylenepentamine, polyethyleneimine, glycerol, trimethylolpropane, pentaerythritol, tolylene-2,4,6-triaminotoluene, ethylene diamine, trimethylenediamine, tetramethylenediamine, pentamethylenediamine, hexamethylenediamine, ethanolamine, diethanolamine, hydrazine, triethanolamine, benzene-1,2,4-tricarboxylic acid, nitrilotriacetic acid, citric acid, 4,4'-methylenebis(o-chloroaniline), and the like. The water soluble or water dispersible crosslinking agents chosen are those which cause a crosslinked network to form during or after the foaming process begins to take place.

To effect foaming and preparation of the crosslinked network polymer, the polymeric polyisocyanate component, the emulsifying agent, the catalyst, and the aqueous reactant are simply combined and suitably mixed. For simplicity the polymeric polyisocyanate component will be referred to herein as the resin reactant.

Catalyst useful herein include those which are commonly employed in isocyanate reactions, such as, for example, tertiary amines, metal catalysts and especially those having tin as a component, or the like. Other catalysts conventionally known for use in isocyanate reactions may be also employed herein as desired.

Representative examples of water-soluble tertiary amines useful herein include 3-morpholinopropionamide, 2-(diethylamino)acetamide, 2-methyl-3-(diethylamino)propionamide, triethylene diamine such as 1,4-diazebicyclo(2,2,2)-octane, N-lower alkyl morpholine such as N-methyl morpholine, N,N,N'N'-tetramethylethylene diamine, N,N,N'N'-tetramethyl-1,3-butanediamine, N,N-diethylcyclohexylamine, and the like.

Further examples of useful catalysts include trimethylamine formate, trimethylamine acetate, triethylamine formate, triethylamine acetate, N-methylmorpholine acetate, N-methylmorpholine citrate, trimethylamine ethylenediamine tetraacetate, and trimethylamine imino triacetate.

Organo tin compounds are also useful as catalysts. Representative examples of such tin containing materials include stannous octoate, stannous oleate, dibutyltin dilaurate, dibutyltin di-2-ethylhexoate, and the like.

The amount of catalyst employed in the foaming reaction varies. Typically, however, amounts of about 0.05% to about 2% by weight of catalyst is used per total parts of foamable resin used.

The aqueous component may appear as water, a water slurry or suspension, a water emulsion, or a water solution having water soluble materials disposed therein. For convenience, the aqueous component is referred to herein as an aqueous reactant.

In contract to typical polyurethane foam reactions such as those using catalyst or like promotors where one mole of -NCO is reacted with one half mole water, the present reaction proceeds simply with a large but controlled excess of water.

The available water content in the aqueous reactant is chosen so as to form a suitably stable emulsion with the resin reactant in the presence of an emulsifying agent. Operable ranges of water content generally fall between about 40% by weight water and about 90% by weight water based on the weight of the total composition. Preferably, this range is between about 35% by weight and about 70% by weight.

"Available water" in the aqueous reactant is that water accessible for reaction with the resin reactant and which is exclusive of supplemental water which may be necessary because of further water-absorbtive or water-binding components or additives present in and forming the aqueous reactant.

The reaction temperature to effect foaming obviously is regulated by various factors such as the viscosity of the resin reactant and the rate of diffusion of water into the emulsified resin reactant phase. By control of temperature, one can uniquely control cream time (keep temperature low) and yet attain fast rise times and molding/curing cycles etc. by use of ovens, dielectric heaters, microwave heating, and the like (increased temperature during the foaming step). The reaction may proceed either as a batch reaction or as a continuous reaction. Either the resin reactant may be poured into the aqueous reactant and emulsifying agent, or both may be combined simultaneously such as when using spray or froth application techniques. Both internal metering/mixing spray equipment and external mixing spray equipment can be used as desired. By proper choice of ingredients, the foams of this invention can vary from flexible to semi-flexible to semi-rigid to rigid, and can be formulated to be foamed by the one-shot process if desired.

The use of large molar excesses of water in the aqueous reactant leads to several important advantages and improvements over the conventional polyurethane foam compositions of the prior art. For example, in conventional polyurethane foam compositions the water concentration must be carefully controlled to near the theoretical amount. This low reactant concentration dictates the use of a catalyst to promote the rate of polymerization foaming reactions, and requires a rapid, intensive mixing step to achieve uniform mixing of water and catalyst so as to insure a reproducible, controllable and uniform cellular product. In contrast, the present invention requires large but controlled excess of water. Using this technique, the product quality and uniformity is not highly sensitive to accuracy of metering of the aqueous reactant and the incorporation of a polymerization catalyst or promoter is easily accomplished either prior to, during, or subsequent to the emulsification step.

Because large amounts of water may be in the aqueous reactant during reaction, it is possible to combine a great variety of materials in the aqueous reactant which are otherwise not possible with limited water reacting systems.

Large amounts of water soluble or water dispersible materials may be added to the aqueous reactant. These materials may be added to the aqueous reactant up to 800% by weight of the amount of water in the aqueous reactant, depending of course on the particular material and its weight. Useful additives to the aqueous reactant include organic and inorganic salts, alcohols, amines, acids, organic solvents, polymer latices, resin or wax dispersions, flame retardants, fungicides, fillers, blowing agents, fibers, cellulosics, surfactants, biostats, pigments, dyes, zeolites, enzymes, chelates, hydrogenation or cracking catalysts, thickeners, stabilizers, promoters or the like. By homogeneously distributing these materials in the aqueous reactant, it is possible to effect wide distribution of these materials throughout the finally prepared foam. Some or all of the above additives added may also be combined into the resin reactant if desired.

If is possible to dispose the resin reactant onto fabrics, either woven or non-woven, paper, or the like with the resin reactant appearing either on the surface or imbibed as desired. Thus, upon contact of such material with water, water spray, steam or moist air, it is possible to prepare tough, flexible to rigid, soft to coarse products. Such products using the present hydrophobic foams may be rendered repellant to liquid water yet breathable and thus permeable to water vapor.

The present foams have great utility for decorative, cushioning, insulative, sound deadening, protective, and/or fire retardant surfaces. Accordingly, these foams may form strippable coatings for protecting articles during handling and shipment. Also, because the present crosslinked foams are easily sterilized, they find great utility as household, industrial and/or biomedical sponges. The feature of open cell porosity control of these sponges renders it attractive for apparel.

The present foams may be prepared by using aqueous slurries of fine vermiculite, ceramic or inorganic powders, silica, clays and the like, solutions of borates, phosphates and the like.

These foams may contain soil, nutrients, and/or fillers for horticultural applications including use as a matrix for plant growth. For this purpose, the present foams are effective for supporting seedlings which may be simply transplanted without root damage.

Catalysts, antioxidants and other chemical reactants may be supported on the foams generated by practice of this invention. Such structures find effective application in a variety of chemical and biological arts including enzymatic reactions, fuel cells, filters, water or blood purification, extraction applications, in separation systems and the like.

A wide variety of solid materials may be added to the present foams to produce changes in properties, particularly to improve load-bearing characteristics. These solid materials which may be added include finely divided solid particles or powders, powdered metals, activated charcoal, carbon blacks, large granular or particulate solids and fibrous materials. Suitable fillers of this type include barium sulfate, aluminum hydrate, zircon sand, calcium carbonate and the like and organic fillers such as shredded cornstalks, straw, hay and the like.

Various conventional radiation barrier materials such as lead, boron hydrides, hafnium titanate and the like may also be combined with the present foams by way of the aqueous reactant.

Although foaming of the present resin reactant is effected simply, it is also possible to add, although not necessary, supplemental foaming materials such as those well known to the artificial sponge foaming art.

The following examples will aid in explaining, but should not be deemed as limiting, practice of the present invention. In all cases, unless otherwise noted, all parts and percentages are by weight.

EXAMPLE 1

A diisocyanate resin was prepared by reacting one mole of the glycol of polytetramethyleneoxide and two moles of tolylene diisocyanate. The product was recovered and used in subsequent reactions under the designation Diisocyanate Resin A.

EXAMPLE 2

A diisocyanate resin was formed from the reaction of 208 grams 0.49 mole, of polyoxypropylene diol having an average molecular weight of 425. The glycol was degassed and dewatered by heating at 10 Torr for 3 hours between 100° and 119°C. To the glycol was then added 167 g., 0.96 mole, of tolylene diisocyanate at a temperature of 50° to 25°C in 20 minutes, the reaction mixture stirred for 2 hours and allowed to stand at 25°C for 16 hours. The final product had 2.80 meq./g NCO and a viscosity of 26,500 cp. The recovered product was used in subsequent reactions under the designation Diisocyanate Resin B.

EXAMPLE 3

The procedure of Example 2 was repeated except that the starting materials and quantities are 302 grams 0.149 mole of polyoxypropylene diol having an average molecular weight of 2025, and 52.2 grams 0.30 mole of tolylene diisocyanate. The final product had 0.866 meq./grams NCO and a viscosity of 3200 cp. The recovered product was used in subsequent reactions under the designation Diisocyanate Resin C.

EXAMPLE 4

To a reaction vessel containing 3,092 grams, representing 1 mole, 3 eq. OH, of a triol prepared from potassium hydroxide catalyzed reaction of 92 grams anhydrous glycerol with 3000 grams of ethylene oxide, were added 522 grams, representing 3 moles, 6 eq. NCO of tolylene diisocyanate having about 80/20 mixture of 2,4 isomer/2,6 isomer. The reaction exotherm was kept at 70°C. by external cooling with water, while stirring for 4 hours. The actual isocyanate content, determined by titration with standard n-butylamine solution in toluene, remained at the constant level of 0.79 meq. NCO/gram relative to a theoretical content of 0.83 meq. NCO/gram. The resultant pale yellow syrup was found to solidify at about 30°–35°C., was soluble in toluene, and acetone, readily reacts with water, and had the following formula:

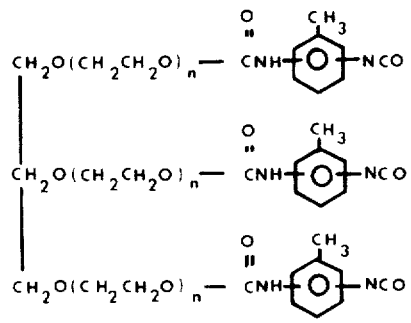

where $n$ has an average value of about 22. The theoretical molecular weight of the resin product is about 3615. The recovered product was used in subsequent reactions under the designation Diisocyanate Resin D.

EXAMPLES 5–22

A series of compositions were processed by mixing Diisocyanate Resins A-D, with additives such as dibutyltindilaurate (DBTDL), triethylenediamine (DABCO), dimethylformamide (DMF), dimethylsulfoxide (DMSO), liquid silicone surfactant marketed as L-520 by Union Carbide Corp. (L-520), N-oleoyliminodiacetic acid (OIDA); and water. Example 5, when compared to Examples 7 and 8 indicates the necessity for use of an emulsifying agent (N-oleoylsarcosine) in obtaining desirable foaming. Example 6 shows that the addition of DMF, along with the emulsifying agent, further improves the foaming. Example 9 demonstrates that the emulsifying agent may be used in the added water as well as in the foam precursor mixture. Examples 10 and 11 show that mixtures of hydrophobic polymeric diisocyanates may be used. Examples 12 to 14 demonstrate that polytetramethylene oxide diisocyanate can be used as well as polypropylene oxide diisocyanate and also these examples demonstrate the dependence of foaming on the emulsifying agent. Examples 15–18 demonstrate the need for a curing catalyst for this system. Examples 19 and 20 indicate again that hydrophilic aprotic solvents may be included in the composition. Example 21 again indicates the desirability of having a curing catalyst in the system, relative to Example 22.

TABLE I

| Example No. | Diisocyanate Resin | (Grams) | Additives | (Grams) | Aqueous Reactant-Water (Grams) | Comments |
|---|---|---|---|---|---|---|
| 5 | B | 10 | N-oleoylsarcosine | 0.1 | 10 | Good rise (<5 minutes)— Dried to 4.2 cm. diameter 6.0 cm. high foam sample. |
|   |   |   | L-520 | 0.1 |   |   |
|   |   |   | DBTDL | 0.2 |   |   |
|   |   |   | DABCO | 0.1 |   |   |
| 6 | B | 10 | N-oleoylsarcosine | 0.3 | 10 | Good rise — 5.0 cm. high, dried to 4.8 cm. height, 5.3 cm. diameter, no distortion. |
|   |   |   | L-520 | 0.1 |   |   |
|   |   |   | DBTDL | 0.1 |   |   |
|   |   |   | DABCO | 0.1 |   |   |
|   |   |   | DMF | 1.0 |   |   |
| 7 | B | 10 | DABCO | 0.1 | 10 | No real foam — material has a taffy appearance in 16 hrs. Water remained unreacted. |
|   |   |   | DBTDL | 0.1 |   |   |
| 8 | B | 10 | LS-520 | 0.1 | 10 | Taffy like — no real rise nor foam |
|   |   |   | DABCO | 0.1 |   |   |
|   |   |   | DBTDL | 0.1 |   |   |
| 9 | B | 12 | L-520 | 0.1 | 10 of 3% Na Lauroyl-sarcosinate | Foam formed, 5.0 cm. diameter, 3–5 cm. high. |
|   |   |   | DABCO | 0.1 |   |   |
|   |   |   | DBTDL | 0.1 |   |   |
| 10 | B | 5 | L-520 | 0.1 | 10 of 3% Na Lauroyl-sarcosinate | Foam, 4.7 cm. high. |
|   | C | 6 | DABCO | 0.1 |   |   |
|   |   |   | DBTDL | 0.1 |   |   |
| 11 | C | 5 | L-520 | 0.1 | 10 of 3% Na Lauroyl-sarcosinate | Foam formed, 5.0 cm. wide, 3.0–5.0 cm. high. |
|   | A | 5 | DABCO | 0.1 |   |   |
|   |   |   | DBTDL | 0.1 |   |   |
| 12 | A | 10 | L-520 | 0.1 | 10 of 3% N-oleoylimino-diacetic acid. | Foam, about 2.0 cm. high. |
|   |   |   | DBTDL | 0.1 |   |   |
|   |   |   | DABCO | 0.1 |   |   |
| 13 | A | 10 | L-520 | 0.1 | 10 of 3% N-oleoyl-sarcosine | Good foam, 4.9 cm. wide, 3.3 cm. high |
|   |   |   | DBTDL | 0.1 |   |   |
|   |   |   | DABCO | 0.1 |   |   |
| 14 | A | 10 | L-520 | 0.1 | 10 of 3% N-lauroyl-sarcosine | Good foam, 5.3 cm. wide, 3.2 cm. high. |
|   |   |   | DBTDL | 0.1 |   |   |
|   |   |   | DABCO | 0.1 |   |   |
| 15 | A | 10 | None |   | 10 of 3% N-oleoyl-sarcosine | More of a gum than a foam. |
| 16 | A | 10 | None |   | 10 of 3% N-lauroyl-sarcosine | Some foam but very poor — 1.7 cm. high. |

TABLE I-continued

| Example No. | Diisocyanate Resin | (Grams) | Additives | (Grams) | Aqueous Reactant-Water (Grams) | Comments |
|---|---|---|---|---|---|---|
| 17 | A | 10 | None | | 10 of 3% Na N-lauroyl-sarcosinate | Hard gel on top — no real foam. |
| 18 | A | 10 | None | | 10 of 3% N-oleoylimino-diacetic acid | No real foam. |
| 19 | A | 10 | N-oleoylsarcosine | 0.3 | 10 | Creamed in about 4 min.; continued |
|   |   |   | DABCO | 0.1 |   | to rise and cured in about 10 min. |
|   |   |   | DBTDL | 0.1 |   |   |
|   |   |   | L-520 | 0.1 |   |   |
|   |   |   | DMSO | 1.1 |   |   |
| 20 | A | 10 | N-oleoylsarcosine | 0.3 | 10 | Creamed in about 30 sec., cured |
|   |   |   | DABCO | 0.1 |   | in 2 min. |
|   |   |   | DBTDL | 0.1 |   |   |
|   |   |   | L-520 | 0.1 |   |   |
|   |   |   | DMF | 1.0 |   |   |
| 21 | A | 11.2 | L-520 | 0.1 | 10 | Distorted and not too much foam |
|   |   |   | N-oleoylsarcosine | 1.2 |   | structure. |
|   |   |   | DMF | 3.1 |   |   |
| 22 | A | 10 | N-oleoylsarcosine | 0.3 | 10 | Four min. to cream time, cure time |
|   |   |   | DABCO | 0.1 |   | 10 minutes, good foam. |
|   |   |   | DBTDL | 0.1 |   |   |
|   |   |   | L-520 | 0.1 |   |   |

EXAMPLES 23–31

Table II shows that the hydrophobic diisocyanate can be used with PAPI over a wide range of compositions to give acceptable foams. Example 28 shows that when PAPI is used, catalysts for curing hydrophobic diisocyanates are not required to give early foaming but are required to give a useful foam.

TABLE II

| Example No. | Diisocyanate Resin | (Grams) | Additives | (Grams) | Aqueous Reactant-Water (Grams) | Comments |
|---|---|---|---|---|---|---|
| 23 | C | 8.2 | L-520 | 0.1 | 10 of 3% N-oleoyl-sarcosine | Cream time about 30 sec. — 5.2 cm. diameter, 4.0 cm. high. |
|   | PAPI | 2.0 | DBTDL | 0.1 |   |   |
|   |   |   | DABCO | 0.1 |   |   |
| 24 | C | 8.0 | N-oleoylsarcosine | 0.3 | 10 | Cream time about 30 sec. — soft foam formed. |
|   | PAPI | 1.8 | L-520 | 0.1 |   |   |
|   |   |   | DABCO | 0.1 |   |   |
|   |   |   | DBTDL | 0.1 |   |   |
| 25 | C | 8.0 | L-520 | 0.1 | 10 of 3% N-lauroyl-sarcosine | Almost immediate rise, cream time less than 30 sec., 5.3 cm. diameter, 4.2 cm. high. |
|   | PAPI | 2.0 | DABCO | 0.1 |   |   |
|   |   |   | DBTDL | 0.1 |   |   |
| 26 | C | 5.0 | L-520 | 0.1 | 10 of 3% N-oleoyl sarcosine | Almost immediate cream, rise time less than 2 min., 5.3 cm. diameter, 7.2 cm. high. |
|   | PAPI | 5.0 | DABCO | 0.1 |   |   |
|   |   |   | DBTDL | 0.1 |   |   |
| 27 | C | 6.5 | L-520 | 0.1 | 10 of 3% N-oleoyl-sarcosine | Exothermic — rapid rise time less than 2 min., 5.8 cm. high, 5.3 cm. diameter. |
|   | PAPI | 3.5 | DABCO | 0.1 |   |   |
|   |   |   | DBTDL | 0.1 |   |   |
| 28 | C | 5.0 | L-520 | 0.1 | 10 | Started to rise in 2 min. Foam height 5.5 cm. but soft and water present, poorly cured. |
|   | PAPI | 5.0 | N-oleoylsarcosine | 0.3 |   |   |
| 29 | B | 5.0 | N-oleoylsarcosine | 0.35 | 10 | Fast rise completely cured in 3 min. Dried to 10 cm. high, 4.6 cm. diameter. |
|   | PAPI | 5.0 | L-520 | 0.1 |   |   |
|   |   |   | DABCO | 0.1 |   |   |
|   |   |   | DBTDL | 0.1 |   |   |
| 30 | B | 8.5 | N-oleoylsarcosine | 0.3 | 10 | Rise time 4 min. Dried 5.5 cm. high, 4.5 cm. diameter. |
|   | PAPI | 1.5 | L-520 | 0.1 |   |   |
|   |   |   | DABCO | 0.1 |   |   |
|   |   |   | DBTDL | 0.1 |   |   |
| 31 | A | 5.0 | N-oleoylsarcosine | 0.3 | 10 | Foamed fairly slowly but rose to high brittle foam — 6.5 cm. high, 5.7 cm. diameter. |
|   | PAPI | 5.0 | L-520 | 0.1 |   |   |
|   |   |   | DABCO | 0.1 |   |   |
|   |   |   | DBTDL | 0.1 |   |   |

EXAMPLE 32

Six grams Resin A and 6 grams Resin D were mixed with 0.3 gram N-oleoylsarcosine, 0.1 gram diethylenetriamine (DABCO), 0.1 gram dibutyl-tindilaurate (DBTDL), and 1 gram of dimethyl sulfoxide (DMSO). To this mixture was then added 10 grams of water with stirring. Creaming and foaming occurred rapidly with an excellent foam being produced with a density of 6 lbs/ft$^3$. It is thus shown that foam mixtures of hydrophilic and hydrophobic polyisocyanates are effectively prepared by the present invention.

EXAMPLE 33

The procedure of Example 32 was repeated except excluding addition of dimethylsulfoxide. Essentially similar results were realized.

EXAMPLES 34–37

Table III following shows that PAPI, essentially a triisocyanate, foams best both in the presence of an emulsifier and curing catalysts, with hard foams resulting.

TABLE III

| Example No. | Reactant | Grams | Additive | Grams | Water Grams | Comments |
|---|---|---|---|---|---|---|
| 34 | PAPI | 10.0 | No additive | | 10 | Foamed overnight to brittle 1.5–2.0 cm. high foam. |
| 35 | PAPI | 10.0 | DABCO<br>DBTDL | 0.1<br>0.1 | 10 | Gelled and gave no foam. |
| 36 | PAPI | 10.0 | N-oleoylsarcosine<br>L-520<br>DABCO<br>DBTDL | 0.3<br>0.1<br>0.1<br>0.1 | 10 | Very brittle but good foam, formed in 5 min. |
| 37 | PAPI | 10.0 | N-oleoylsarcosine | 0.3 | 10 | Gave no foam in 15 min., then started slowly to foam but no real foam developed in 30 min. |

EXAMPLES 38–47

TABLE IV

| Example No. | Polymer (Grams) | Crosslinking Agent (Grams) | Emulsifying Agent (Grams) | Catalyst (Grams) | Surfactant (Grams) | Water (Grams) | Rise Time (Hours) | Foam Characteristics |
|---|---|---|---|---|---|---|---|---|
| 38 | L-213(25) | 0 | None | T-9(0.6) | None | 25 | — | No foam. |
| 39 | " | 0 | L-101(0.75) | " | " | " | 0.5 | Foam Density 5.1 lbs/ft³ |
| 40 | " | 0 | " | Thancat (0.06) | " | " | 1.0 | Foam Density 6.4 lbs/ft³ |
| 41 | " | 0 | " (In water) | " | " | " | 0.8 | Foam Density 25 lbs/ft³ |
| 42 | " | PAPI(7.6) | None | Thancat (0.11) | " | " | — | No foam. |
| 43 | " | " | L-121(0.75) | " | " | " | 0.55 | Good foam generated. |
| 44 | " | PAPI(3.8) | " | " | L-520 (2.5 g) | " | 0.6 | Foam Density 7.7 lb/ft³ |
| 45 | " | " | " | " | " | " | 0.8 | Foam Density 3 lb/ft³ |
| 46 | " | PAPI(7.6) | " | " | " | " | 0.16 | Foam Density 3.7 lb/ft³ |
| 47 | " | " | " | DABCO (0.10 g) | " | " | 0.33 | Foam Density 2.0 lb/ft³ |

Table IV illustrates use of non-ionic agents in practice of the present invention. The polymer used in these examples is that sold by DuPont under the mark Adiprene L-213, a polytetramethylene oxide polymer endcapped with tolylenediisocyanate. This polymer has a specific gravity of about 1.11, a Brookfield viscosity at 84°F. of about 10,000 cps, and an isocyanate content of 9.25 to 9.65%.

The emulsifiers used in these examples include the well known "Pluronic" materials such as Pluronic L-121, a non-ionic polyoxyethylene/polyoxypropylene copolymer having 10% polyoxyethylene and a 4,000 molecular weight polyoxypropylene backbone; and Pluronic L-101, a non-ionic polyoxyethylene/polyoxypropylene copolymer having 10% by weight of polyoxyethylene and a 3250 molecular weight polyoxypropylene backbone.

Further materials used in these examples included T-9, a stannous octoate catalyst by M & T Chemical Corp. Thancat DD, N-hydroxyethylmorpholine by Jefferson Chemical Co.; PAPI, a polymethylenephenylisocyanate crosslinking agent by Upjohn Co.; and L-520, a silicone surfactant by Union Carbide Corp.

In these examples, Example 38 illustrates that use of L-213 with T-9 catalyst exclusive of emulsifier does not give a desirable foam. Examples 39–41 show preparation of satisfactory foams using the Pluronic type emulsifiers either in the polymer reactant or in the water phase. Example 42 illustrates the use of L-213, PAPI and catalyst but exclusive of emulsifier. No foam is formed. Examples 43–47 demonstrate formation of satisfactory foams using related materials with emulsifier.

EXAMPLE 48

The procedure of Example 45 was repeated further including with the aqueous reactant, 10 grams Raney nickel sponge in suspension. After mixing all ingredients, the composition was placed in an oven at 60°C. The cream time noted was about 20 seconds, the rise time was about 5 minutes, and the final time to cure was about 12 minutes. The product foam had a black appearance with an open cell structure.

EXAMPLE 49

The procedure of Example 5 was repeated further including with the aqueous reactant, 10 grams of a mixture of humus, sand, and vermiculite in suspension. The cream time noted was within 3 minutes, the rise time was about 4 minutes, and the final time to cure was about 6 minutes. The product foam was characterized with a soft, open cell structure which was flexible and did not crumble when handled.

EXAMPLE 50

The procedure of Example 13 was repeated further including with the aqueous reactant, 1.5 grams soft wood paper pulp. The cream time noted was about 5 seconds, the rise time was about 3 minutes, and the final time to cure was about 5 minutes. The product foam was characterized with a soft open cell structure which was flexible yet fairly tough.

EXAMPLE 51

The procedure of Example 5 was repeated further including with the aqueous reactant, 20 grams of sand. The cream time noted was about 45 seconds, the rise time was about 3 minutes, and the final time to cure was about 5 minutes. The product foam was characterized with an abrasive texture, open cell flexible foam structure which was fairly strong against tear.

EXAMPLE 52

The procedure of Example 13 was repeated further including with the aqueous reactant, 5 grams Vermiculite fines. The cream time noted was about 10 seconds, the rise time was about 5 minutes, and the final time to cure was about 8 minutes. The product foam was a semi-flexible foam.

EXAMPLE 53

The procedure of Example 45 was repeated except that the water contained 0.5 gram of Hansa yellow color. After 45 minutes the yellow cured hydrophobic flexible foam mass was recovered.

EXAMPLE 54

In order to illustrate bonding of an enzyme in its active form to the present hydrophobic/hydrophilic polymer matrix to form a useful novel catalytic surface, the procedure of Example 33 was repeated using distilled water having dissolved therein crude urease crystals extracted using 500 ml. of 32% aqueous acetone, from 100 grams jack bean meal. The resultant initial creamy froth was poured into a 1.5 inch diameter by 12 inch long polyethylene tube and allowed to expand and cure to its maximum volume for a period of 10 minutes. The surface skins at both ends of the foam column were cut off. The resultant open celled foam column was continually washed over a period of 16 hours at 25°C. with a fresh stream of 2 liters of distilled water containing 5% of a phosphate buffer having pH 7.

250 ml. of a 3% aqueous solution of urea containing 10% phosphate buffer at pH 7 was passed through the column over a period of 1.5 hours while at a temperature of 25°c. Titration of the combined filtrate with 1 normal HCl showed that 67.8% of the urea had been converted to ammonia plus $CO_2$. This same test was repeated periodically over a period of 6 weeks with the column thoroughly washed with distilled water between runs. Conversion of urea for each run never dropped below 63%, and in some cases was as high as 82%.

EXAMPLE 55

In order to demonstrate the ease with which various substrates can be coated or impregnated with the present reactant resins to form integrally bonded foam coatings or composites, the following substrates were coated on one side with the resin mixture of Example 29 containing the additives and emulsifying agent. The coated substrates were then immersed for 145 seconds in 50°C. water to develop flexible foam pads which were in every case integrally bonded to the substrate.

TABLE V

| Substrate | Size (Cm.) | Resin (Grams) | Average Thickness Foam Pad (mm) |
|---|---|---|---|
| Regular kraft paper | 10 × 40 | 15 | 4.5 |
| Muslin sheet | 10 × 40 | 15 | 5.5 |
| Unbacked, needled carpet polypropylene fiber, (0.05 g/cm² density) | 20 × 40 | 30 | 4.5 |
| ½" thick Plywood | 10 × 20 | 7.5 | 4.3 |

The 5.5 mm thick pad of flexible foam attached to a muslin sheet is useful as a fabric interliner for wearing apparel, shoe and boot linings and insoles, various types of gas and liquid filters, light weight blankets, mattress covers, coasters, tablecloths, diapers, incontinent pads, upholstery fabrics, mattress ticking, drapery fabrics, sound absorbing wall coverings, carpet and rug under padding, bathroom and bedroom slippers and the like.

EXAMPLE 56

The resin with additives of Example 29 was reacted with water and after creaming was applied to a 20 × 24 cm. polypropylene unbacked carpet. The reacting froth was immediately doctored onto one side of the carpet in a uniform layer. Within 2.5 minutes the froth expanded and cured to a 5 mm. thick tack free foam pad which was integrally bonded to the carpet.

EXAMPLE 57

The procedure of Example 55 using the polypropylene carpet was repeated except that the water further contained 5 grams barium sulfate powder and 3 grams aluminum hydrate. The resulting integrally padded carpet has improved sound absorption and flame retardant characteristics. This composite laminate was also useful as a functional and decorative resilient wall covering.

EXAMPLE 58

To illustrate the ease and simplicity of fabrication of foam products by the process of this invention, the following procedure was performed. One liter of the resin reactant mixture from Example 29 at 60°C. was charged into one chamber of a Binks Model 181N dual nozzle spray gun. One liter of tap water mixture with additives was charged in the other chamber. Air pressure was applied to both chambers at 40 to 50 psi.

The resultant co-sprayed product aerosol stream was directed to a mold cavity and filled to 1/20 of its capacity. After cut-off of the spray stream, the rise time of the foam mixture was less than 5 minutes. After 10 minutes the foam was tack-free and could be stripped from the mold in the form of a flexible, resilient bun. Because of its three-dimensional network structure, it could readily be sterilized by autoclaving at 15 psi. saturated steam.

The term hydrophobic has been used herein to include members having up to about 40 to 50 percent by weight of hydrophilic moieties, in addition to those having all hydrophobic moieties.

All time intervals used herein start at the point when resin reactant first contacts water. Next, cream time is taken as that time required for the formulation to start foaming, which is followed by a rise time which is the interval from the start of foaming to the point where the foam reaches its greatest volume. Cure time follows and defines the time interval from start of the foaming to the point where the surface of the foam is tack free.

The foams resulting from the instant invention have many and varied uses. They may be flexible, semi-rigid or rigid in nature. Further examples of some uses include, but are not limited to, elastomeric sealants, coatings, cushioning, padding, sponges, encapsulating or potting, impregnants and coatings and laminates for fabric, cloth, fibrous webs and other porous substrates, laminates, mastics, fiberglass reinforced composites, surface finishing, foam gasketing, sound deadening, fire retardants, rocket fuel binders, and the like.

The preferred foams of the present invention are those that are crosslinked, and are found to be resistant to solvents such as benzene, tetrahydrofuran, dimethyl formamide which typically affect polyurethane foams having linear structures.

The simplicity and foolproof nature of preparing the present foams without excessive expenditures for equipment renders them economically attractive.

It is understood that the foregoing detailed description is given merely by way of illustration and that many variations may be made therein without departing from the spirit of this invention.

We claim:

1. A method for preparation of hydrophobic polyurethane foam which comprises, reacting the condensation prepolymer of polyisocyanate and essentially water-insoluble polyalkylene ether polyol or essentially water-insoluble polyalkylene ester polyol with large amounts of an aqueous reactant while in the presence of a catalyst and an emulsifying agent, maintaining an emulsion during foaming of the reactants, the water content of the aqueous reactant being about 35% to about 90% by weight based on the weight of the total composition to be foamed, the emulsifying agent being present in an amount of about 0.25 to about 10 parts per 100 parts of the condensation prepolymer and selected from the group consisting of fatty acyl sarcosine, fatty alkyl sarcosine, acyl-iminodiacetic acid, alkyl-iminodiacetic acid and condensates of ethylene oxide with a hydrophobic base, the catalyst being present in an amount of about 0.05% to about 3% by weight of the condensation prepolymer and selected from the group consisting of 3-morpholinopropionamide, 2-(diethylamino) acetamide, 2-methyl-3-(diethylamino)propionamide, triethylene diamine, N-lower alkyl morpholine, N,N,N'N'-tetramethylethylene diamine, N,N,N'N'-tetramethyl-1,3-butane-diamine, N,N-diethylcyclohexylamine trimethylamine formate, trimethylamine acetate, triethylamine formate, triethylamine acetate, N-methylmorpholine acetate, N-methylmorpholine citrate, trimethylamine ethylenediamine tetraacetate, trimethylamine imino-triacetate, stannous octoate, stannous oleate, dibutyltin dilaurate, dibutyltin and di-2-ethylhexoate, and the said polyalkylene ether polyol or polyalkylene ester polyol having a weight average molecular weight of about 200 to about 20,000 and a hydroxyl functionality ranging from about 2 to about 8 hydroxyl groups per molecule, the ratio in the condensation prepolymer of isocyanate groups in the polyisocyanate to the hydroxyl groups being between about 1 to about 4 isocyanate to hydroxyl molar ratio, and recovering a hydrophobic polyurethane foam.

2. The method of claim 1 wherein said ether or ester has a functionality equal to 2, and wherein said reaction is effected in the presence of a crosslinking agent, in amounts only sufficient to produce a three-dimensional crosslinked foam, wherein the crosslinking agent is selected from the group consisting of diethylenetriamine, triethylenetetramine, tetraethylenepentamine, polyethyleneimine, glycerol, trimethylolpropane, pentaerythritol, tolylene-2,4,6-triaminotoluene, ethylene diamine, trimethylenediamine, tetramethylenediamine, pentamethylenediamine, hexamethylenediamine, ethanolamine, diethanolamine, hydrazine, triethanolamine, benzene-1,2,4-tricarboxylic acid, nitrilotriacetic acid, citric acid, and 4,4'-methylenebis(o-chloroaniline).

3. The method of claim 1 wherein the molar ratio in the condensation prepolymer, is about 2 to about 3 isocyanate to hydroxyl.

4. The method of claim 1 wherein the water content of the aqueous reactant is between about 40% to about 70% by weight.

5. The method of claim 1 wherein the molecular weight range of the said polyalkylene ether polyol or polyalkylene ester polyol is about 600 to about 6,000.

6. The method of claim 1 further including a filler during foaming.

7. The product prepared by the method of claim 1.

8. The product prepared by the method of claim 1 in combination with a substrate.

* * * * *